United States Patent
Tsuda et al.

(10) Patent No.: US 10,694,579 B2
(45) Date of Patent: Jun. 23, 2020

(54) COMMUNICATIONS TERMINALS, INFRASTRUCTURE EQUIPMENT AND METHODS, FOR UE:S ACTING AS RELAYS

(71) Applicant: SONY CORPORATION, Tokyo (JP)

(72) Inventors: Shinichiro Tsuda, Basingstoke (GB); Brian Alexander Martin, Basingstoke (GB); Hideji Wakabayashi, Basingstoke (GB)

(73) Assignee: SONY CORPORATION, Tokyo (JP)

(*) Notice: Subject to any disclaimer, the term of this patent is extended or adjusted under 35 U.S.C. 154(b) by 169 days.

(21) Appl. No.: 15/564,333

(22) PCT Filed: Apr. 21, 2016

(86) PCT No.: PCT/EP2016/058854
§ 371 (c)(1),
(2) Date: Oct. 4, 2017

(87) PCT Pub. No.: WO2016/188680
PCT Pub. Date: Dec. 1, 2016

(65) Prior Publication Data
US 2018/0146507 A1   May 24, 2018

(30) Foreign Application Priority Data
May 22, 2015 (EP) .................................. 15169053

(51) Int. Cl.
*H04W 88/04* (2009.01)
*H04W 68/00* (2009.01)
*H04W 68/02* (2009.01)

(52) U.S. Cl.
CPC ......... *H04W 88/04* (2013.01); *H04W 68/005* (2013.01); *H04W 68/02* (2013.01)

(58) Field of Classification Search
CPC ... H04W 88/04; H04W 68/005; H04W 76/28; H04W 4/70; H04W 68/02
See application file for complete search history.

(56) References Cited

U.S. PATENT DOCUMENTS

| | | | |
|---|---|---|---|
| 2012/0155355 A1 | 6/2012 | Kwon et al. | |
| 2012/0238208 A1 | 9/2012 | Bienas et al. | |

(Continued)

FOREIGN PATENT DOCUMENTS

| | | |
|---|---|---|
| EP | 2 387 279 A1 | 11/2011 |
| WO | 2016/128213 A1 | 8/2016 |
| WO | 2016/128277 A1 | 8/2016 |

OTHER PUBLICATIONS

"3rd Generation Partnership Project; Technical Specification Group Radio Access Network; Small cell enhancements for E-UTRA and E-UTRAN—Physical layer aspects (Release 12)" Technical Report, 3GPP TR 36.872 V12.1.0, Dec. 2013, (100 pages).

(Continued)

*Primary Examiner* — Pao Sinkantarakorn
*Assistant Examiner* — Kabir U Jahangir
(74) *Attorney, Agent, or Firm* — Xsensus LLP

(57) ABSTRACT

A communications terminal includes a transmitter configured to transmit signals via a wireless access interface to infrastructure equipment and to one or more of other communications terminals with a device-to-device communications protocol, a receiver configured to receive signals via the wireless access interface from the infrastructure equipment and from one or more of the other communications terminals with a device-to-device communications protocol, and a controller configured to control the transmitter and receiver to transmit and to receive data via the wireless access interface when in a connected mode and to select one of the one or more infrastructure equipment from which to receive paging messages for down-link communications (Continued)

when in an idle mode. The controller can enter a DRX-connected mode to control the receiver to only monitor a communications terminal acting as a relay node to determine whether the receiver can no longer receive paging messages from that communications terminal.

17 Claims, 12 Drawing Sheets

(56) References Cited

U.S. PATENT DOCUMENTS

| | | | |
|---|---|---|---|
| 2013/0315122 A1* | 11/2013 | Sirotkin | H04W 4/70 370/311 |
| 2015/0327204 A1* | 11/2015 | Park | H04W 56/0015 370/350 |
| 2016/0057806 A1* | 2/2016 | Wittberg | H04W 52/0216 370/336 |
| 2016/0242231 A1* | 8/2016 | Vajapeyam | H04W 24/08 |
| 2016/0337954 A1* | 11/2016 | Gulati | H04W 76/14 |
| 2017/0223753 A1* | 8/2017 | Hoglund | H04W 88/04 |
| 2018/0048986 A1* | 2/2018 | Adachi | H04W 8/00 |
| 2018/0084478 A1* | 3/2018 | Lee | H04W 40/12 |
| 2018/0084497 A1* | 3/2018 | Jung | H04W 72/0406 |
| 2018/0092017 A1* | 3/2018 | Freda | H04W 76/14 |

OTHER PUBLICATIONS

Harri Holma, et al., "LTE for UMTS OFDMA and SC-FDMA Based Radio Access," John Wiley & Sons, Ltd., 2009, (8 pages) (Table of Contents and Preface only).

Ericsson, "Signalling to support UE-NW relay and Service continuity," 3 GPP TSG-RAN WG2 #89bis Tdoc R2-151148, Apr. 20-24, 2015, (7 pages).

Qualcomm Incorporated, "Study on LTE Device to Device Proximity Services," 3GPP TSG RAN Meeting #58, RP-122009, Dec. 4-7, 2012, (6 pages).

"3rd Generation Partnership Project; Technical Specification Group Radio Access Network; Study on LTE Device to Device Proximity Services; Radio Aspects (Release 12)" Technical Report, 3GPP TR 36.843 V12.0.1, Mar. 2014, (50 pages).

Qualcomm Incorporated, "Work Item Proposal for Enhanced LTE Device to Device Proximity Services," 3GPP TSG RAN Meeting #66, RP-142229, Dec. 8-11, 2014, (8 pages).

"3rd Generation Partnership Project; Technical Specification Group Radio Access Network; Evolved Universal Terrestrial Radio Access (E-UTRA); Medium Access Control (MAC) protocol specification (Release 12)" Technical Specification, 3GPP TS 36.321 V12.4.0, Dec. 2014, (60 pages).

Qualcomm Incorporated, "Work item proposal on LTE Device to Device Proximity Services," 3GPP TSG RAN Meeting #63, RP-140518, Mar. 3-6, 2014, (7 pages).

International Search Report dated Jul. 12, 2016 in PCT/EP2016/058854 filed Apr. 21, 2016.

* cited by examiner

COMMUNICATIONS TERMINALS, INFRASTRUCTURE EQUIPMENT AND METHODS, FOR UE:S ACTING AS RELAYS

CROSS-REFERENCE TO RELATED APPLICATIONS

The present application is based on PCT filing PCT/EP2016/058854 filed Apr. 21, 2016, and claims priority to European Patent Application 15 169 053.4, filed in the European Patent Office on 22 May 2015, the entire contents of each of which being incorporated herein by reference.

TECHNICAL FIELD OF THE DISCLOSURE

The present disclosure relates to communications terminals, infrastructure equipment and methods, and more specifically to providing an arrangement in which a first communications terminal in an idle mode may establish a connection with a second communications terminal acting as a relay node to relay communications with an infrastructure equipment, in the case that the first communications terminal leaves the coverage area of the infrastructure equipment.

Embodiments of the present technique can provide methods of communicating data in a small cell environment where the communications terminals may be configured to perform device-to-device communications, and communication terminals may be configured to act as relay nodes.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications terminal such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications terminals, or when communications between communications terminals are required but the communications terminals may not be within the coverage area of a network. In order to address these limitations, in LTE release-12 the ability for LTE communications terminals to perform device-to-device (D2D) communications will be introduced.

D2D communications allow communications terminals that are in close proximity to communicate directly with each other, both when within and when outside of a coverage area or when the network fails. This D2D communications ability can allow user data to be more efficiently communicated between communications terminals by obviating the need for user data to be relayed by a network entity such as a base station, and also allows communications terminals that are in close proximity to communicate with one another although they may not be within the coverage area of a network. The ability for communications terminals to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution for public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications terminals.

It has been envisaged therefore that there is a requirement to perform D2D communications between a group of communications terminals which are outside of a coverage area of an LTE mobile communications network, which may communicate between devices using a repeat request communications protocol or the like.

SUMMARY OF THE DISCLOSURE

According to an example embodiment of the present disclosure there is provided a communications terminal forming part of a mobile communications network comprising one or more infrastructure equipment and one or more other communications terminals. The communications terminal comprises a transmitter configured to transmit signals via a wireless access interface to the infrastructure equipment and to transmit signals via the wireless access interface to one or more of the other communications terminals in accordance with a device-to-device communications protocol, a receiver configured to receive signals via the wireless access interface from the infrastructure equipment and to receive signals via the wireless access interface from one or more of the other communications terminals in accordance with a device-to-device communications protocol, and a controller configured to control the transmitter and the receiver to transmit and to receive data via the wireless access interface when in a connected mode and to select one of the one or more infrastructure equipment from which to receive paging messages for down-link communications when in an idle mode. The controller is configured to detect, when in the idle mode, that the receiver cannot receive paging messages from any of the one or more infrastructure equipment, to enter a connected mode, to discover that one or more of the other communications terminals can act as a relay node to transmit signals to one of the one or more infrastructure equipment which represent data having been transmitted by the transmitter and received by the relay node and to receive signals from the relay node which represent data transmitted by the infrastructure equipment for the communications terminal, to select one of the discovered communications terminals to act as a relay node for the communications terminal, and to establish a connection with the infrastructure equipment via the relay node to register with the mobile communications network that paging messages for the communications terminal should be transmitted to the relay node, for transmission to the communications terminal.

In one example, the receiver may be configured in combination with the controller to operate in accordance with an extended discontinuous reception (DRX) communications protocol. This extended DRX protocol comprises the controller being configured to enter a DRX-connected mode in which the controller controls the receiver to only monitor the communications terminal acting as a relay node to determine whether the receiver can no longer receive the paging messages from the communications terminal acting as a relay node. When in the DRX-connected mode, the controller is configured to control the receiver to be configured to receive signals for a predetermined portion of a predetermined period. The predetermined period may be determined in accordance with a DRX cycle.

When a communications terminal communicates with an eNodeB, it may move out of coverage. In this case, a relay node can be used in order to relay signals between the two. Optimising the efficiency of relayed communications is an important area of consideration in mobile communications systems.

In the case of the communications terminal moving out of coverage of the eNodeB being in an idle mode, the communications terminal would not be able to register its location with a mobile communications network, because in idle mode the communications terminal is responsible for managing its mobility. It is therefore necessary for the communications terminal itself to judge that it is going out of coverage, and to compensate for this by establishing a connection with an in-coverage communications terminal acting as a relay node between the communications terminal going out of coverage and the eNodeB. Alternatively, the communications terminal may, as a contingency plan for any potential movement out of coverage, establish the connection with the in-coverage communications terminal acting as a relay node between the communications terminal going out of coverage and the eNodeB Various further aspects and features of the present technique are defined in the appended claims, which includes a method of controlling communications in a mobile communications system, a first communications terminal forming part of a mobile communications system, a method of operating a first communications terminal forming part of a mobile communications system, a second communications terminal forming part of a mobile communications system, a method of operating a second communications terminal forming part of a mobile communications system, and circuitry for a mobile communications system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
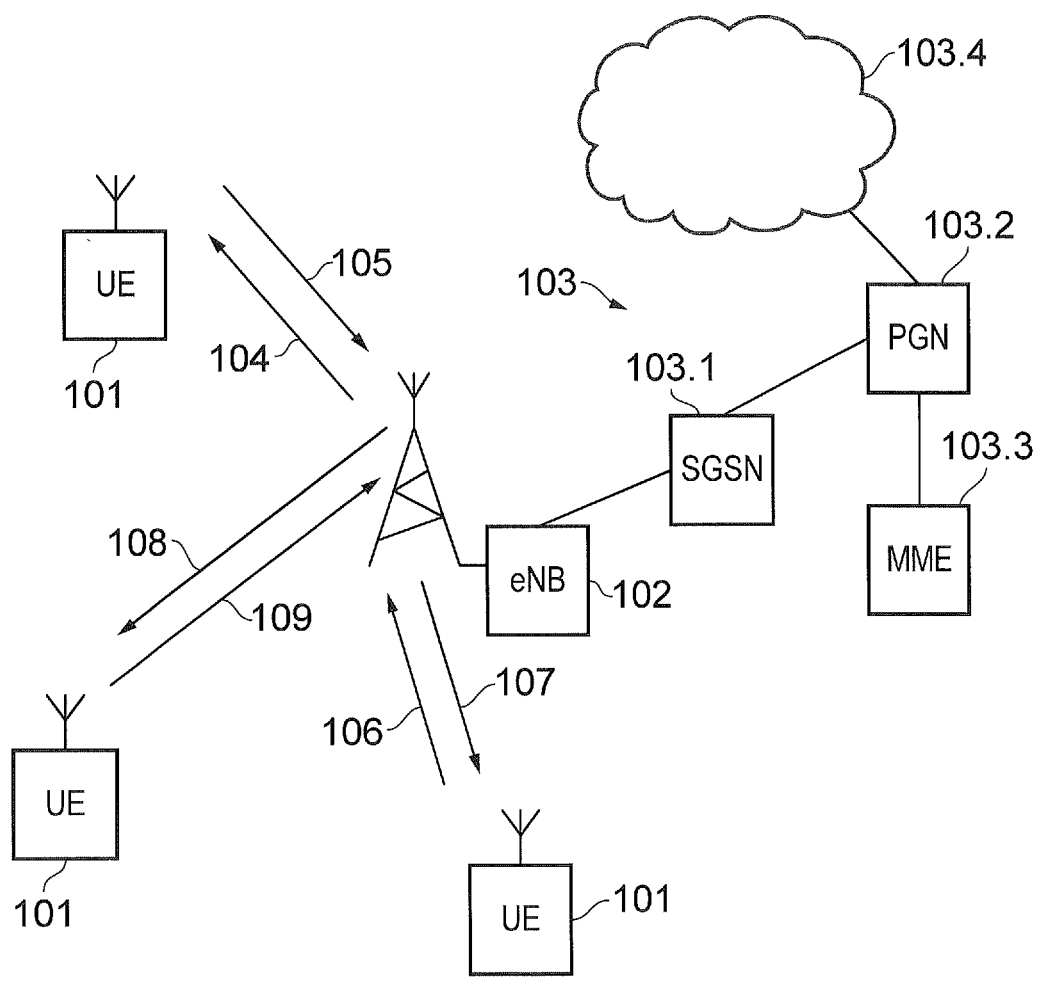
FIG. 1 provides a schematic diagram of a mobile communications system.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Device-to-Device Communications

FIG. 1 provides a schematic diagram of a conventional mobile telecommunications system 100, where the system includes mobile communications terminals 101, infrastructure equipment 102 and a core network 103. The infrastructure equipment may also be referred to as a base station, network element, enhanced Node B (eNodeB) or a coordinating entity for example, and provides a wireless access interface to the one or more communications terminals within a coverage area or cell. The one or more mobile communications terminals may communicate data via the transmission and reception of signals representing data using the wireless access interface. The network entity 102 is communicatively linked to core network components such as a serving gateway support node 103.1, a packet data gateway 103.2, a mobility management entity 103.3, and an external network 103.4, which may be connected to one or more other communications systems or networks which have a similar structure to that formed from communications terminals 101 and infrastructure equipment 102. The core network may also provide functionality including authentication, mobility management, charging and so on for the communications terminals served by the network entity. The mobile communications terminals of FIG. 1 may also be referred to as communications terminals, user equipment (UE), terminal devices and so forth, and are configured to communicate with one or more other communications terminals served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications terminals and 105, 107 and 109 represent the uplink communications from the communications terminals to the network entity. The communications system 100 may operate in accordance with any known protocol, for instance in some examples the system 100 may operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Figure 2:
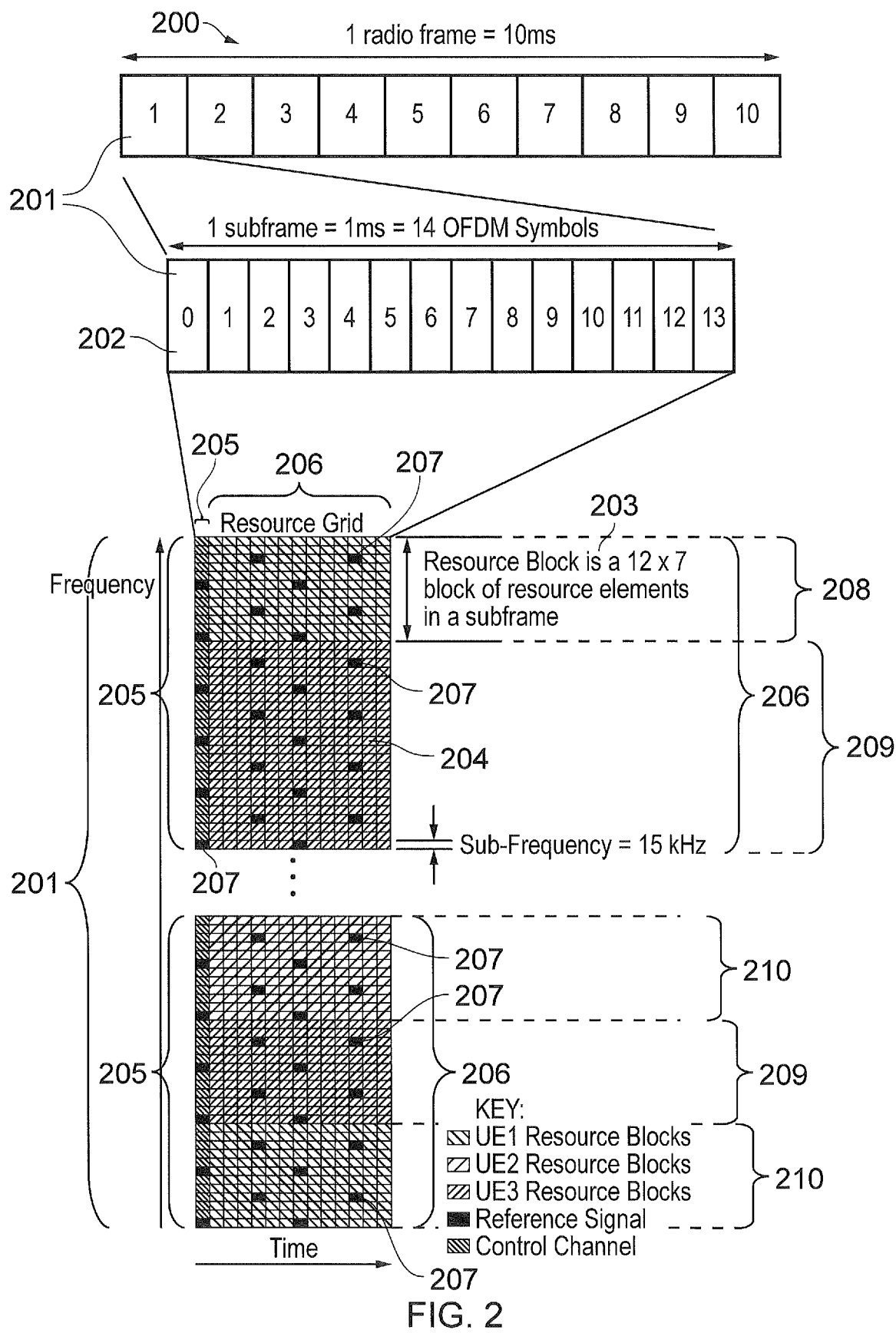
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [3].

Resources within the PDSCH may be allocated by an eNodeB to communications terminals (UEs) being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDSCH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
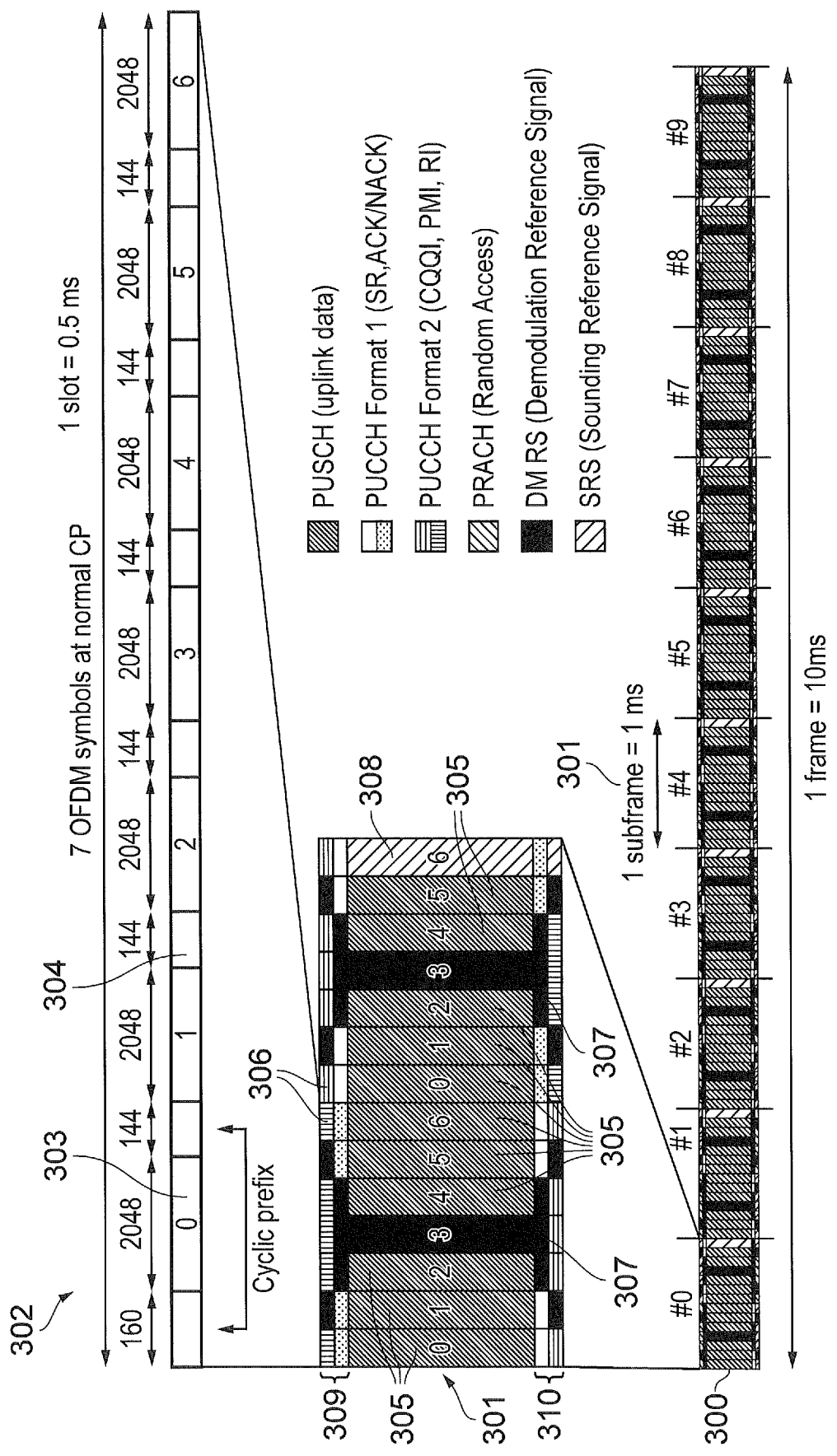
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to ten subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
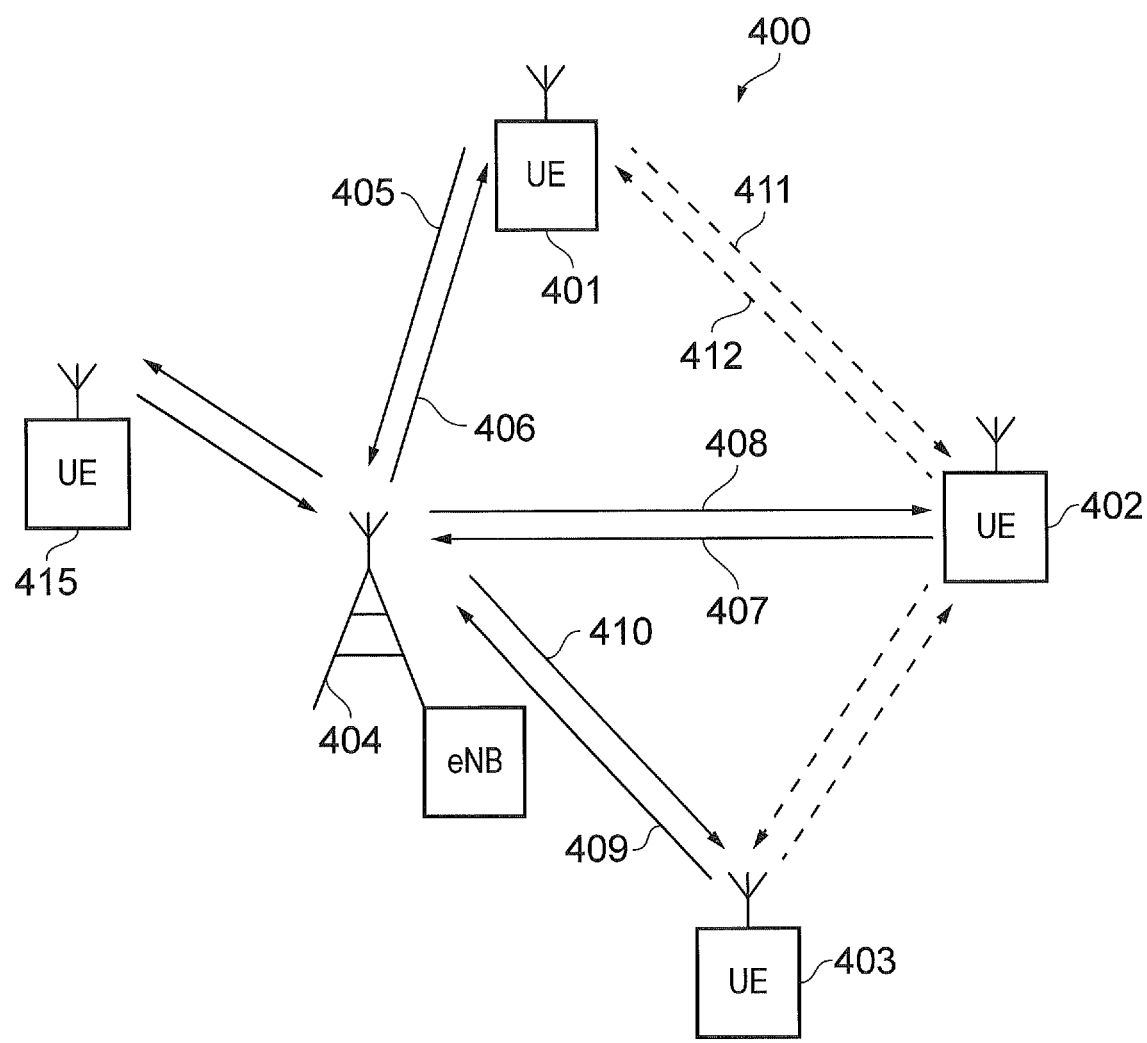
FIG. 4 provides a schematic diagram of a mobile communications system in which communications terminals can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401, 402, 403, 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Relay Nodes

Figure 5:
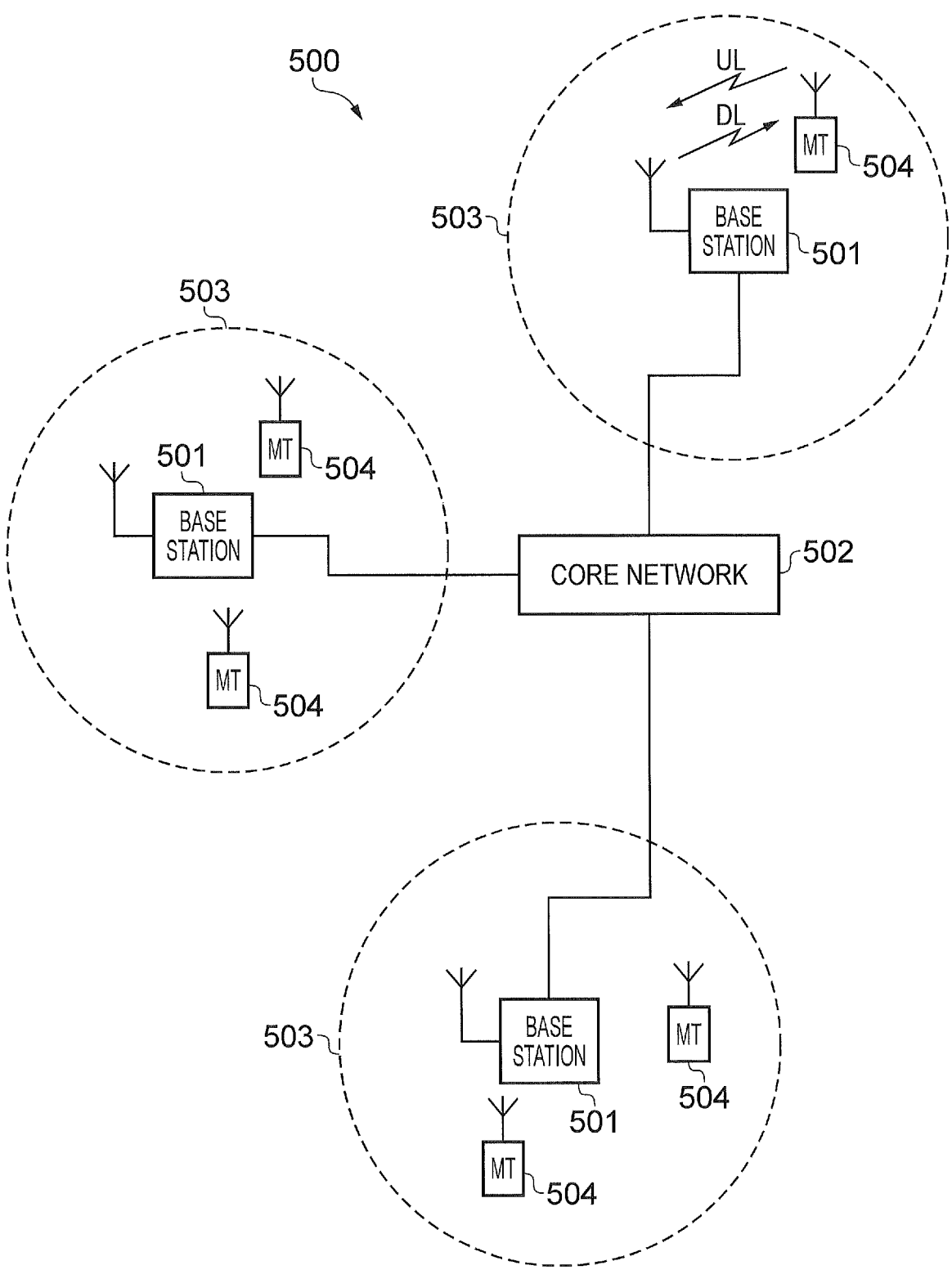
FIG. 5 provides a schematic diagram of a mobile communications system according to an example of an LTE standard.

In order to provide a better appreciation of embodiments of the present technique and their advantages, an explanation will now be provided of a mobile communications network, such as the example network explained above with reference to FIGS. 1 to 4, adapted to support relay nodes which may be provided in a small cell environment. FIG. 5 provides a schematic diagram illustrating some basic functionality of a conventional mobile communications network, using for example a 3GPP defined UMTS and/or Long Term Evolution (LTE) architecture, which has been simplified with respect to the example in FIG. 1 to support the following explanation. As for the network shown in FIG. 1, the mobile telecommunications network/system 500 of FIG. 5 operates in accordance with LTE principles and which may be adapted to implement embodiments of the disclosure as described further below. Various elements of FIG. 5 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 500 includes a plurality of base stations 501 connected to a core network 502. Each base station provides a coverage area 503 (i.e. a cell) within which data can be communicated to and from communications terminals 504. Data is transmitted from base stations 501 to the communications terminals 504 within their respective coverage areas 503 via a radio downlink. Data is transmitted from the communications terminals 504 to the base stations 501 via a radio uplink. The uplink and downlink communications are made using radio resources that are licensed for use by the operator of the network 500. The core network 502 routes data to and from the communications devices 504 via the respective base stations 501 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 501 of FIG. 5 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 501 may be realized as any other types of base stations such as a NodeB and a base transceiver station (BTS). The base station 501 may include a main body (that is also referred to as a base station apparatus) configured to control radio communication, and one or more remote radio heads (RRH) disposed in a different place from the main body. In addition, various types of terminals, which will be described below, may each operate as the base station 501 by temporarily or semi-persistently executing a base station function.

Any of the communications terminals 504 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications terminal 504 may also be realized as a terminal (that is also referred to as a machine type communication (MTC) terminal) that performs machine-to-machine (M2M) communication. Furthermore, the terminal apparatus 504 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier is available.

Figure 6:
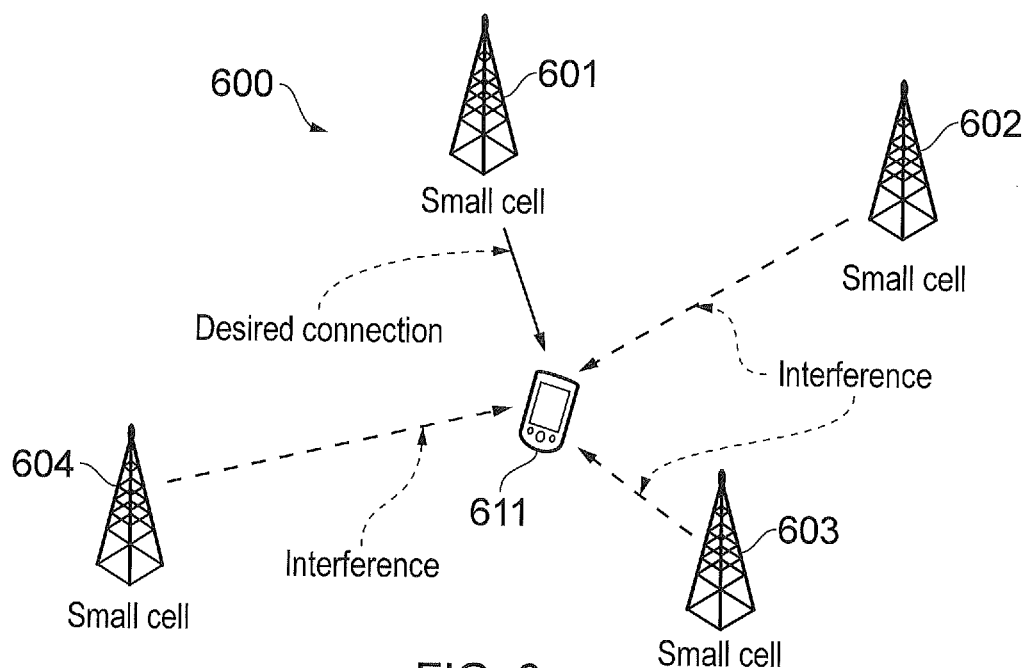
FIG. 6 schematically illustrates an example of a small cell environment.

FIG. 6 illustrates an example of a small cell environment 600 wherein a plurality of base stations 601 to 604 are operable to communicate with terminals, such as terminal 611. In this example, the terminal 611 is in communication with base station 601 providing a first small cell but is within the range of the small cell for each of base stations 602, 603 and 604. As a result, the signals sent by base station 601 to terminal 611 can suffer from interference from signals transmitted by base stations 602 to 604. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have the additional difficulty that a small cell may be mobile, i.e. not stationary, while network planning for a macrocell or legacy femto/picocells was generally based on stationary or fixed base stations. This also increases the complexity of trying to reduce interference significantly. Of course, interference between small cells can be significant when the number of deployed small cells increases such that in a dense small cell environment, interference reduction can be challenging. As a result, in the event that the interference affects synchronisation signals or reference signals of small cells, terminals may not even be able to discover and connect to small cells.

Figure 7:
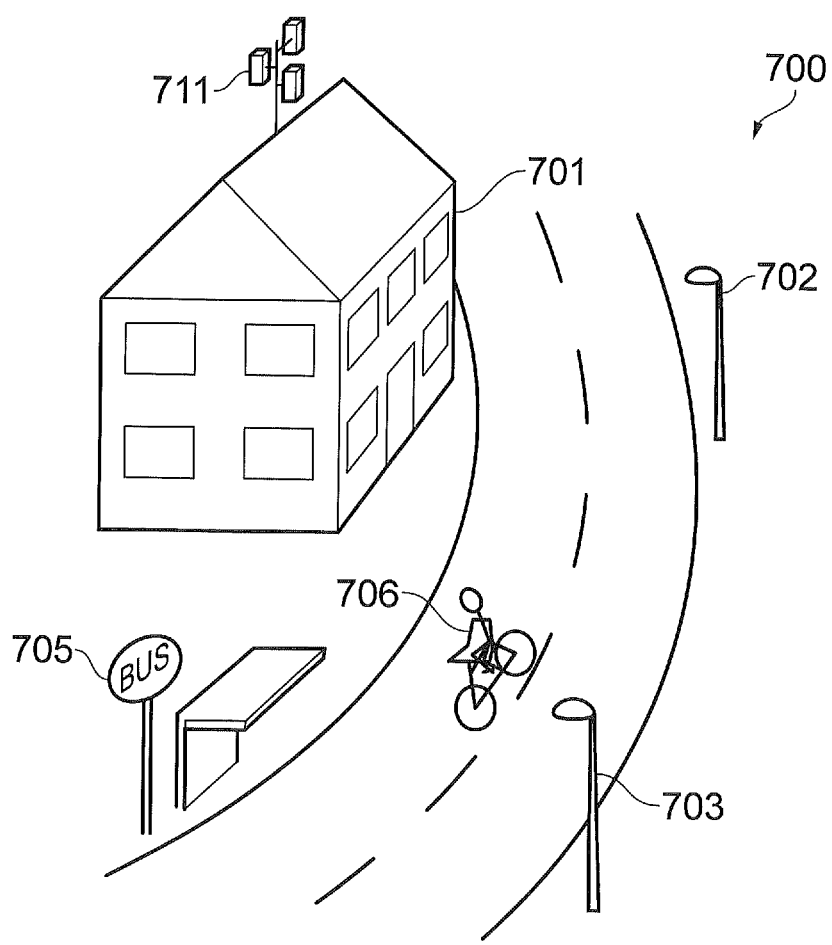
FIG. 7 illustrates another example of a small cell environment.

An example of a small cell environment 700 is illustrated in FIG. 7, where a macrocell base station 711 is provided in the same area as small cells provided by a base station 701 in or in the vicinity of a building, by a base station 702 in a first lamppost, by a base station 703 in a second lamppost, by a base station 705 provided in a bus stop and by a mobile base station 706 provided in a cyclist back-pack. In this example, the planning for interference may vary depending on traffic and on time. For example a cyclist may enter an interference zone this zone. However, the base station 701, if serving an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 8:
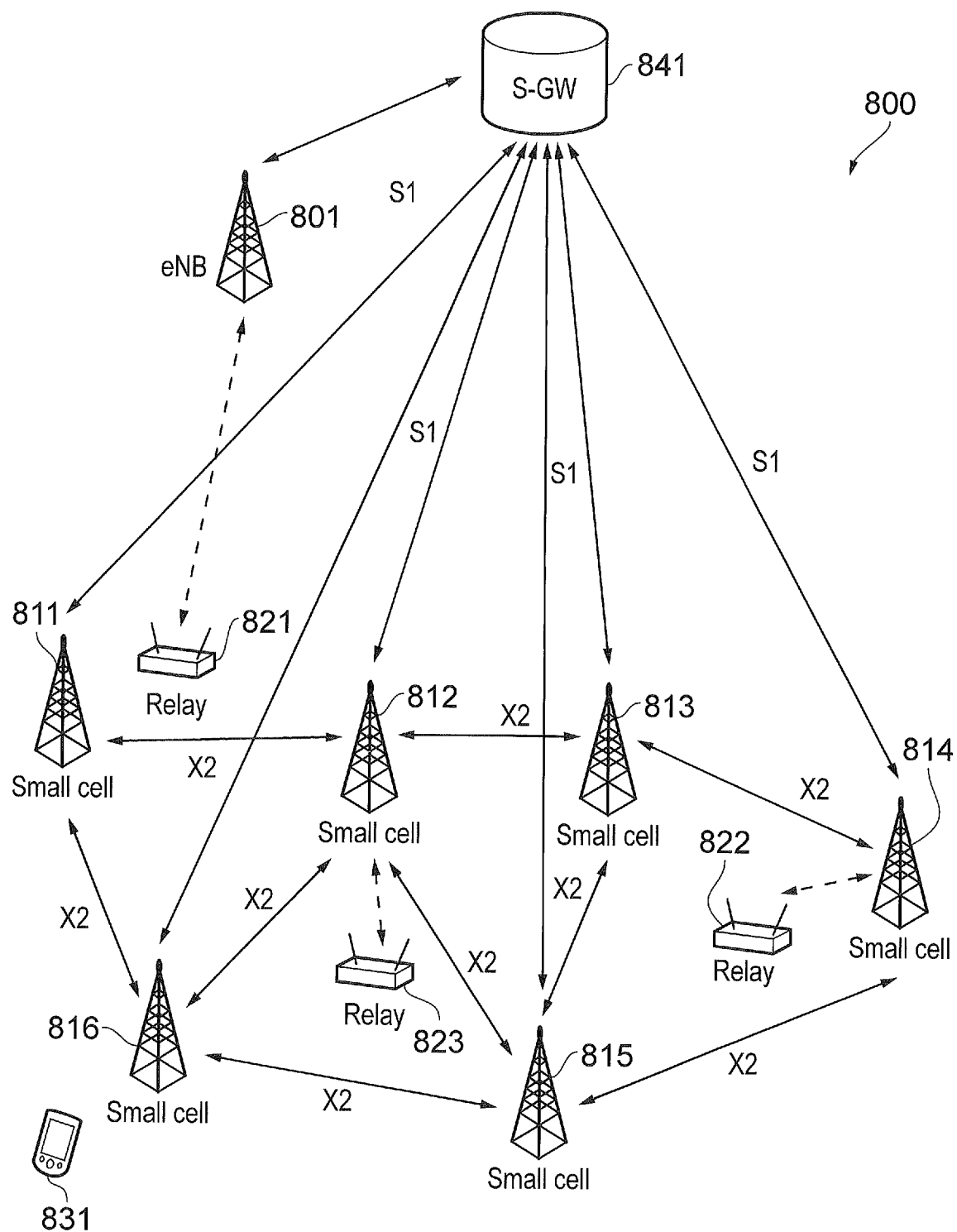
FIG. 8 illustrates an example system for communicating with at least a terminal in a heterogeneous network.

Moreover, mobile networks can also include relay nodes which can further increase the complexity of the mobile system and of the reduction of interference in a small cell network. FIG. 8 illustrates an example system 800 for communicating with at least a terminal 831. In this system 800, a base station 801 provides a macrocell and six base stations 811 to 816 provide small cell coverage, potentially overlapping with the coverage of the base station 801. Additionally, three relay nodes 821 to 823 are provided and are operating with base stations 801, 814 and 812, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, a backhaul link may also be provided over a wired connection. This is in contrast to a small cell base station which, as mentioned above, can generally operate like a base station and is thus connected to the core network, as illustrated by the arrows between the small cell base stations 811 to 816 and the Serving Gateway "S-GW" in FIG. 8. Relay nodes may also send or receive data with the terminals or base stations, forming an ad-hoc network which can also add to the complexity of dealing with interference in an environment as illustrated in FIG. 8.

Relay technologies are known generally to provide an arrangement for receiving signals from a base station and for retransmitting the received signals to a user equipment (UE, a communications terminal) in a mobile communications network, or to receive signals transmitted from a UE for re-transmission to a base station of a mobile communications network. The aim of such relay nodes is to try to extend a radio coverage area provided by a mobile communications network to reach communications terminals which would otherwise be out of range of the mobile communications network or to improve the ratio of successful transmissions between a terminal and a base station.

A UE may be in an idle mode, in which it is not visible to its serving eNodeB. The UE may enter this mode in order to conserve power, if it determines that it is not receiving or transmitting messages at a high enough rate for it to justifiably remain in a connected mode. When in the idle mode, the UE may receive paging messages from its serving eNodeB in order to request the establishment of a non access stratum (NAS) signalling connection to the UE. The eNodeB transmits this paging message such that it may be received by the UE (still in idle mode) at any point inside the coverage region, or serving cell, of the eNodeB. The reception of the paging message by the UE culminates in it leaving the idle mode and re-entering the connected mode, in which it is ready to receive or transmit signals representing data.

However, should the UE move out of coverage of the eNodeB, whilst the UE is in idle mode, then there is no way for the eNodeB to know this. Should the eNodeB wish to communicate with the UE, it will not be able to reach it with the paging messages, and the UE will never be aware that the eNodeB is attempting communication. Even if the eNodeB could prepare some candidate in-coverage UEs to operate as a relay node for this out of coverage UE in idle mode somehow, since it is not known by any of the candidate UEs when the out of coverage UE may attempt to communicate signals to the eNodeB, the candidate UEs may continuously transmit discovery messages to the out-of-coverage UE until it is reached. This may then result in a trail of communication and the waste of battery for operating the relay node UE candidates.

Therefore, it is proposed that a UE which detects it is moving out of coverage, or may at a later time move out of coverage of its serving eNodeB, establishes a connection with a relay UE such that it is able to receive via the relay UE a paging message from the eNodeB.

This is advantageous in that a UE may move back to an idle mode after establishing a connection with a candidate UE acting as a relay node, but will still have a facility for receiving paging messages from its serving eNodeB via the relay UE. Since the UE is able to remain in idle mode, power may be saved, and power may also be saved by candidate relay UEs and the eNodeB as it is no longer necessary to transmit discovery messages without knowledge of the location of the UE. Further, the UE may operate in a DRX-connected mode, in which it operates with extended discontinuous reception (DRX). The UE may be in a connected mode briefly before returning to an idle mode as part of a DRX cycle. By relay UEs sending Sidelink Control (SC) information including scheduling information to the UE in the DRX-connected mode by the DRX cycle synchronised to the UE's operation with DRX, a similar procedure to the paging procedure for the standard idle mode may be carried out, again saving the UEs and eNodeB power.

Coverage Extension for D2D UE-to Network Relay for UE in Idle Mode

According to an example embodiment of the present disclosure there is provided a communications terminal forming part of a mobile communications network comprising one or more infrastructure equipment and one or more other communications terminals. The communications terminal comprises a transmitter configured to transmit signals via a wireless access interface to the infrastructure equipment and to transmit signals via the wireless access interface to one or more of the other communications terminals in accordance with a device-to-device communications protocol, a receiver configured to receive signals via the wireless access interface from the infrastructure equipment and to receive signals via the wireless access interface from one or more of the other communications terminals in accordance with a device-to-device communications protocol, and a controller configured to control the transmitter and the receiver to transmit and to receive data via the wireless access interface when in a connected mode and to select one of the one or more infrastructure equipment from which to receive paging messages for down-link communications when in an idle mode. The controller is configured to detect, when in the idle mode, that the receiver cannot receive paging messages from any of the one or more infrastructure equipment, to enter a connected mode, to discover that one or more of the other communications terminals can act as a relay node to transmit signals to one of the one or more infrastructure equipment which represent data having been transmitted by the transmitter and received by the relay node and to receive signals from the relay node which represent data transmitted by the infrastructure equipment for the communications terminal, to select one of the discovered communications terminals to act as a relay node for the communications terminal, and to establish a connection with the infrastructure equipment via the relay node to register with the mobile communications network that paging messages for the communications terminal should be transmitted to the relay node, for transmission to the communications terminal.

Figure 9:
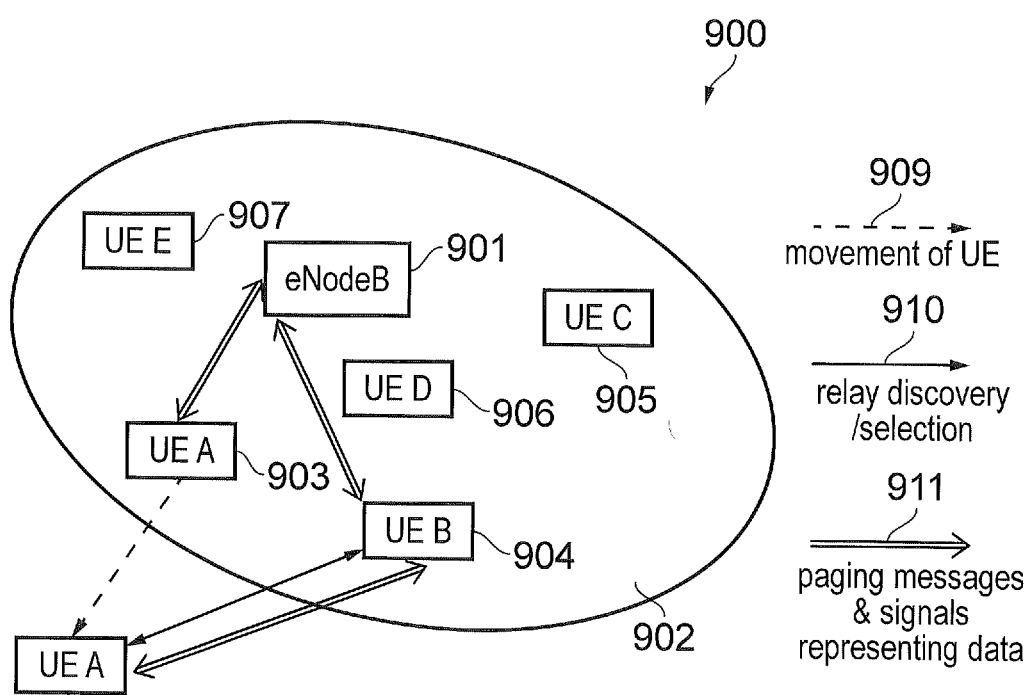
FIG. 9 illustrates an example mobile communications system in accordance with the present technique.

The receiver may be configured in combination with the controller to operate in accordance with an extended discontinuous reception (DRX) communications protocol. This comprises the controller being configured to enter a DRX-connected mode in which the controller controls the receiver to only monitor the communications terminal acting as a relay node to determine whether the receiver can no longer receive the paging messages from the communications terminal acting as a relay node. When in the DRX-connected mode, the controller is configured to control the receiver to be configured receive signals for a predetermined portion of a predetermined period, wherein the predetermined period is determined in accordance with a DRX cycle. FIG. 9 illustrates an example mobile communications system 900 in accordance with an arrangement of the present disclosure.

The system comprises an eNodeB 901, with a coverage area 902, and five communications terminals, or UEs 903 to 907. The UE A 903 may be in an idle mode, in which it is not visible to the eNodeB 901. However, since it is inside the coverage area 902 of the eNodeB 901, the UE A 903 is able to receiving paging messages (and subsequently signals representing data) 911 from the eNodeB 901.

However, should the UE A 903 move 909 outside of the coverage area of the eNodeB 901 while in the idle mode to a new position 908, the UE A at the new position 908 will not be able to receive paging messages or signals representing data 911 from the eNodeB 901. Therefore, should the UE A 903 detect that it is about to move outside of the coverage area 902 of the eNodeB 901, or that there is a chance that it may do in the future, the UE A 903 discovers and selects 910 UE B 904 from the remaining UEs 904 to 907 to act as a relay node for it. Now, UE B 904 is able to relay paging messages and signals representing data 911 between the eNodeB 901 and the UE A 903 should the UE A move outside of the coverage area 902 of the eNodeB 901 when in the idle mode, providing the UE A 903 stays in coverage of the UE B 904.

Figure 10:
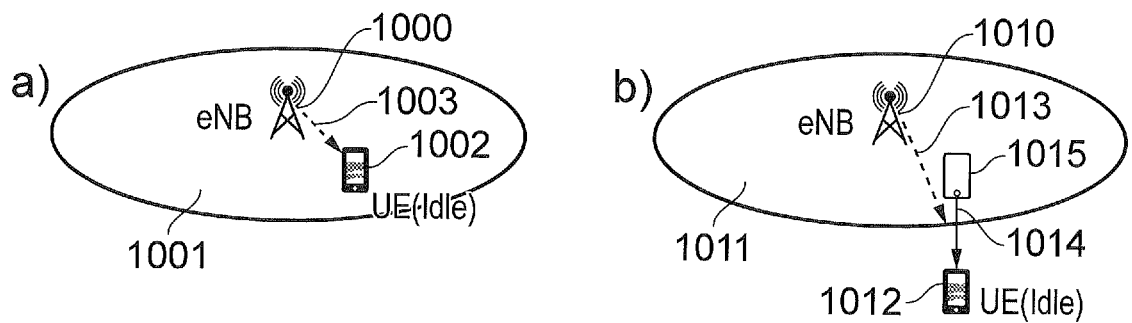
FIG. 10 illustrates an example of a UE in an idle mode moving out of coverage of an eNodeB in accordance with the present technique.

FIG. 10a shows an eNodeB 1000 with a coverage area 1001 transmitting a paging message 1003 to a UE 1002 where the UE 1002 is in an idle mode, but is inside the coverage area 1001 of the eNodeB 1000. FIG. 10b shows that, however, should a UE 1012 where the UE 1012 is in an idle mode move 1014 out of a coverage area 1011 of an eNodeB 1010 from a previous position 1015 inside the coverage area 1011 of the eNodeB 1010, there is no way for the eNodeB 1010 to know this. Should the eNodeB 1010 wish to communicate with the UE 1012, it will not be able to reach it with paging messages 1013, and the UE 1012 will never be aware that the eNodeB 1010 is attempting communication.

Figure 11:
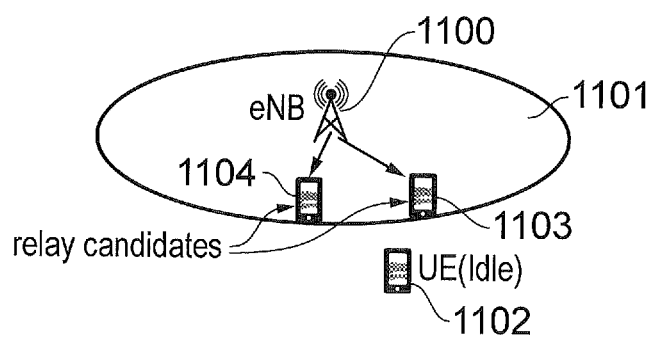
FIG. 11 illustrates an example of candidate UEs to act as a relay node for UE in an idle mode which has moved out of coverage of an eNodeB in accordance with the present technique.

FIG. 11 shows an eNodeB 1100 with a coverage area 1101 with two UEs 1103 and 1104 inside the coverage area 1101 of the eNodeB 1100, and a UE 1102 where the UE 1102 is in an idle mode outside of the coverage area 1101 of the eNodeB 1100. Even if the eNodeB 1100 could prepare the in-coverage UEs 1103 and 1004 as candidates to operate as a relay node for the UE 1102 in idle mode somehow, since it is not known by either of the candidate UEs 1103 and 1104 when the UE 1102 may attempt to communicate signals to the eNodeB 1100, the candidate UEs 1103 and 1104 may continuously transmit discovery messages to the UE 1102 until it is reached. This may then result in a trail of communication and the waste of battery for operating the relay node UE candidates 1103 and 1104.

As it is assumed that the coverage of neighbouring cells could cover UE (in-coverage UE), the operation in the idle mode (RRC_IDLE) should be reasonable. This is because the UE is able to reduce power consumption when compared to operating with discontinuous reception (DRX). Also, the eNodeB can recognise that the UE should be somewhere within the area belonging to the TA (Tracking Area) by performing TA updating with DRX. The eNodeB can perform paging based on TA information, whenever the eNodeB needs to communicate data to the UE. Further, the UE is always able to track the serving cell by performing cell reselection in order to monitor any broadcasted information from the eNodeB.

However, it is possible that the UE may move out of the coverage area of any eNodeB, and so this operation in the idle mode for an out of coverage UE is not always reasonable. The purpose of the claimed invention is to offer the same function as an in coverage UE in the idle mode has, to an out of coverage UE in the idle mode.

By using a device-to-device (D2D) UE-to-network (UE-NW) relay scheme, the eNodeB can provide out-of-coverage UE with uplink and downlink wireless connection via a relay UE. However, this UE should be in a connected state with the relay, similar to the RRC_CONNECTED mode whereby the remote UE has a non access stratum NAS context with the eNodeB relayed via PC5 interface (between two devices) and forwarded by L3 in the relay UE. So, in order to have a similar effect to the UE in idle mode, the UE is allowed to monitor PDCCH and to update Tracking Area discontinuously to receive paging messages from the eNodeB with less power consumption. Furthermore, the operation with DRX can be applicable to this UE in the connected mode having the connection under UE-NW relay.

Figure 12:
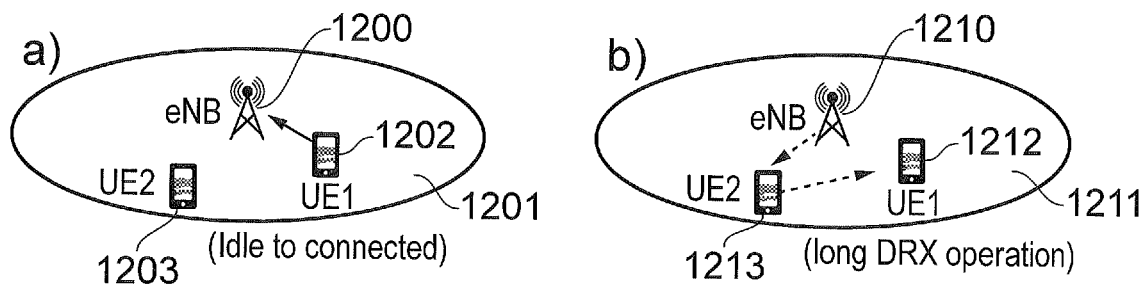
FIG. 12 illustrates an example of the setup of a UE-to-network relay for a UE in an idle mode in accordance with the present technique.

FIG. 12a shows an eNodeB 1200 with a coverage area 1201, a UE 1202 and a UE 1203 where the UE 1202 moves from an idle mode to a connected mode, and the UE 1202 is inside the coverage area 1201 of the eNodeB 1200. UE 1202 detects that it is possible that it may move out of the coverage area 1201 of the eNodeB 1200. The UE 1202 in idle mode uses this as a trigger to set up a UE-NW relay based on results of cell selection/reselection. When the UE 1202 in idle mode triggers this setup, the UE 1202 might move into the connected mode and relay selection will be performed. This relay selection can be triggered by the UE 1202 or the eNodeB 1200 by means of any procedures according to techniques disclosed in our co-pending European patent applications EP15154659.5 and EP15154751.0, the contents of which are incorporated herein by reference.

FIG. 12b shows an eNodeB 1210 with a coverage area 1211, a UE 1212 and a UE 1213 where the UE 1212 is operating in accordance with the DRX-connected mode where the DRX cycle is preferable a Long DRX cycle, and the UE 1212 is inside the coverage area 1211 of the eNodeB 1210. After the UE 1212 establishes a UE-NW relay connection with UE 1213, the UE 1212 automatically is configured to operate with DRX. The cycle of DRX can be updated by the eNodeB 1210 during operating with any cycle of DRX using DRX Command. As well as the automatic transition to DRX, when the UE-NW relay connection with the UE 1213 is established, a timer is set or reset, and then unless some transmission of data between the UE 1212 and the UE 1213 is performed by the expiration of the timer, the UE 1212 might be configured to operate with the DRX-connected mode, rather than the idle mode. Here, unless the UE 1213 is handling any other UE than the UE 1212, the eNodeB 1210 can indicate the UE 1213 to operate in the DRX-connected mode. During the UE's 1212 operation with in the DRX-connected mode under UE-NW relay 1213, the UE 1212 can perform a cell selection procedure for searching any service of eNodeBs at any timing which can be set by the eNodeB 1210. If the UE 1212 finds a service of an eNodeB during this operation, the UE 1212 should trigger a procedure to change service from the relay UE 1213 to the new eNodeB. The eNodeB 1210 indicates to the UE 1213 to stop the operation as relay and unless the UE 1213 is handling any other remote UE than the UE 1212, the UE 1213 makes a decision to stop the operation as relay for remote UEs.

Figure 13:
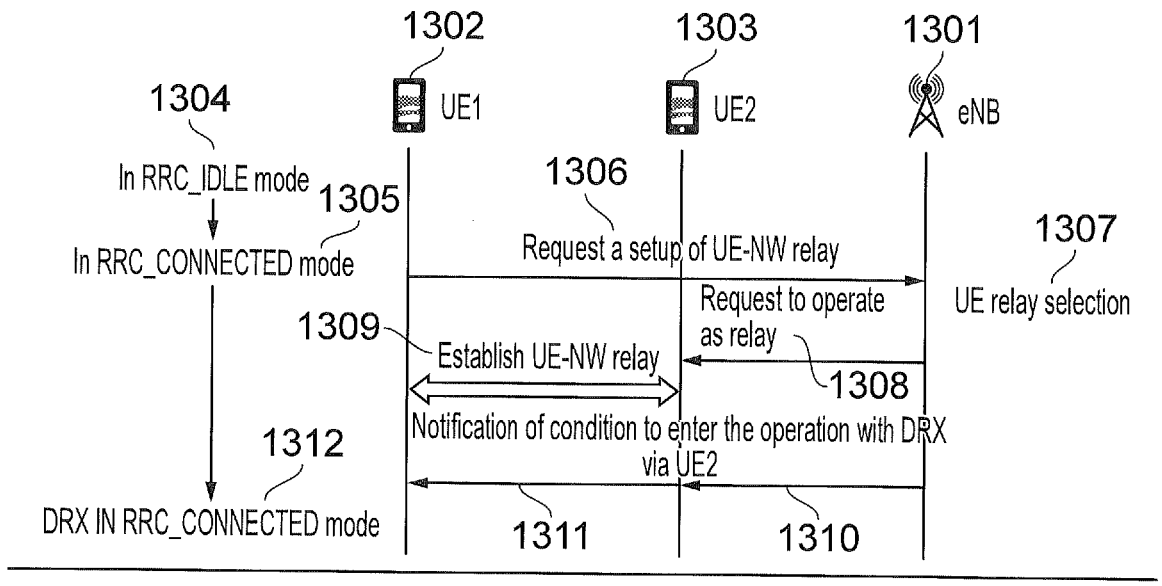
FIG. 13 illustrates an example of a procedure for the setup of a UE-to-network relay for a UE in an idle mode in accordance with the present technique.

FIG. 13 illustrates an example of a procedure for the setup of a UE-to-network relay for a UE in an idle mode forming part of a mobile communications network in accordance with the present technique. The mobile communications network comprises an eNodeB 1301 and two UEs 1302 and 1303. The UE 1302 is initially in an idle mode 1304, and may decide, on the basis of adjudging there is a chance it may go out of coverage of the eNodeB 1301, that it requires a UE-NW relay to relay messages between the UE 1302 and the eNodeB 1301. To do this, the UE 1302 enters a connected mode 1305, and transmits a request message 1306 to the eNodeB 1301, which performs a UE relay selection 1307. The eNodeB 1301 may decide that the UE 1303 is the best candidate to act as a relay node for the UE 1302, and so transmits a request message 1308 to the UE 1303 to operate as a relay node. The UE 1303 and the UE 1302 then establish the UE-NW relay connection 1309.

At a point later in time, the eNodeB may decide that the UE 1302 should operate in accordance with a DRX-connected mode 1312. The eNodeB may transmit via 1310 the relay UE 1303 a notification of a condition to enter the operation with DRX 1311, at which point the UE 1302 enters the DRX-connected mode. If the UE 1302 prefers to make automatic transition to the DRX-connected mode 1312 while in the connected mode 1305, then the request to setup UE-NW relay 1306 can include an indication to perform automatic transition after finishing setup. This relay selection can be triggered by the UE 1302 or the eNodeB 1301 by means of any procedures according to techniques disclosed in our co-pending European patent applications EP15154659.5 and EP15154751.0. The notification of a condition to enter the operation with DRX via the UE 1303 can include information regarding the cycle of DRX (for example "Short DRX or "Long DRX"), duration until entering DRX-connected 1312 mode for a timer and so on. When the UE 1302 meets the condition to enter the operation with DRX, the UE 1302 makes a transition of mode from the connected mode 1305 to the DRX-connected mode 1312.

Furthermore the UE 1302 in the DRX-connected mode 1312 can make a transition to the idle mode 1304 if the UE 1302 when in the connected or DRX-connected modes 1305 or 1312 doesn't have any paging by SC (Sidelink Control), or perform handover and relay selection/reselection during some duration which can be counted by a timer. This timer can be set in a predetermined manner or configured by the eNodeB 1301 via SIBs (System Information Blocks) or some dedicated signalling. Here, any further enhanced technology of DRX which allows for the UE 1302 to be in the DRX-connected mode 1312 (i.e. eDRX; enhanced DRX) or idle mode 1304 can be applicable to the claimed invention.

Figure 14:
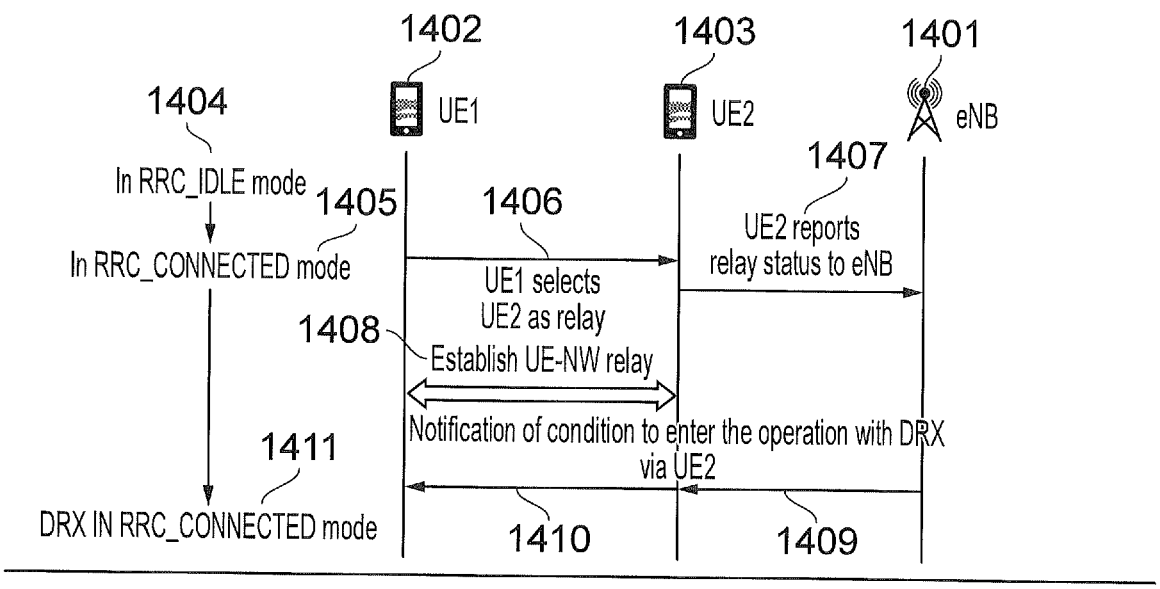
FIG. 14 illustrates another example of a procedure for the setup of a UE-to-network relay for a UE in an idle mode in accordance with the present technique.

FIG. 14 illustrates another example of a procedure for the setup of a UE-to-network relay for a UE in an idle mode forming part of a mobile communications network in accordance with the present technique. The mobile communications network comprises an eNodeB 1401 and two UEs 1402 and 1403. The UE 1402 is initially in an idle mode 1404, and may decide, on the basis of adjudging there is a chance it may go out of coverage of the eNodeB 1401, that it requires a UE-NW relay to relay messages between the UE 1402 and the eNodeB 1401. To do this, the UE 1402 enters a connected mode 1405, and transmits a message 1406 to the UE 1403 selecting it as the UE-NW relay, without sending a request message to the eNodeB 1401. The UE 1403 then relays this message on to the eNodeB 1401 informing it of its status as a UE-NW relay for the UE 1402. The UE 1403 is then established 1408 as the UE-NW relay for the UE 1402.

At a point later in time, the eNodeB may decide that the UE 1402 should operate in accordance with a DRX-connected mode 1411. The eNodeB may transmit via 1409 the relay UE 1403 a notification of a condition to enter the operation with DRX 1410, at which point the UE 1402 enters the DRX-connected mode. If the UE 1402 prefers to make automatic transition to the DRX-connected mode 1411 while in the connected mode 1405, then the request to setup UE-NW relay 1406 can include an indication to perform automatic transition after finishing setup. This relay selection can be triggered by the UE 1402 or the eNodeB 1401 by means of any procedures according to techniques disclosed in our co-pending European patent applications EP15154659.5 and EP15154751.0. The notification of a condition to enter the operation with DRX via the UE 1403 can include information regarding the cycle of DRX (for example "Short DRX or "Long DRX"), duration until entering DRX-connected 1411 mode for a timer and so on. When the UE 1402 meets the condition to enter the operation with DRX, the UE 1402 makes a transition of mode from the connected mode 1405 to the DRX-connected mode 1411.

Furthermore the UE 1402 in the DRX-connected mode 1411 can make a transition to the idle mode 1404 if the UE 1402 when in the connected or DRX-connected modes 1405 or 1411 doesn't have any paging by SC (Sidelink Control), or perform handover and relay selection/reselection during some duration which can be counted by a timer. This timer can be set in a predetermined manner or configured by the eNodeB 1401 via SIBs (System Information Blocks) or some dedicated signalling. Here, any further enhanced technology of DRX which allows for the UE 1402 to be in the DRX-connected mode 1411 (i.e. eDRX; enhanced DRX) or idle mode 1404 can be applicable to the claimed invention.

One of the important activities of a UE in the idle mode and the DRX-connected mode could be the monitoring a paging message. The purpose of this paging procedure from the serving eNodeB of the UE is to trigger a setup of connection between the eNodeB and the UE when the eNodeB would like to send data to it. If the UE is in the idle mode, the eNodeB may only recognise that the UE is somewhere within the coverage area of eNodeBs belonging to a same TA (Tracking Area). So all eNodeBs belonging to the same TA broadcast this paging message in order to notify the UE that downlink data will be scheduled. For a UE in the DRX-connected mode, since the network should have recognised that the UE is served by a specific eNodeB, the serving eNodeB can start to perform scheduling resources for data to UE without the above paging procedure for the UE in the connected mode, and may send PDCCH including scheduling information by a cycle of the operation with DRX.

Figure 15:
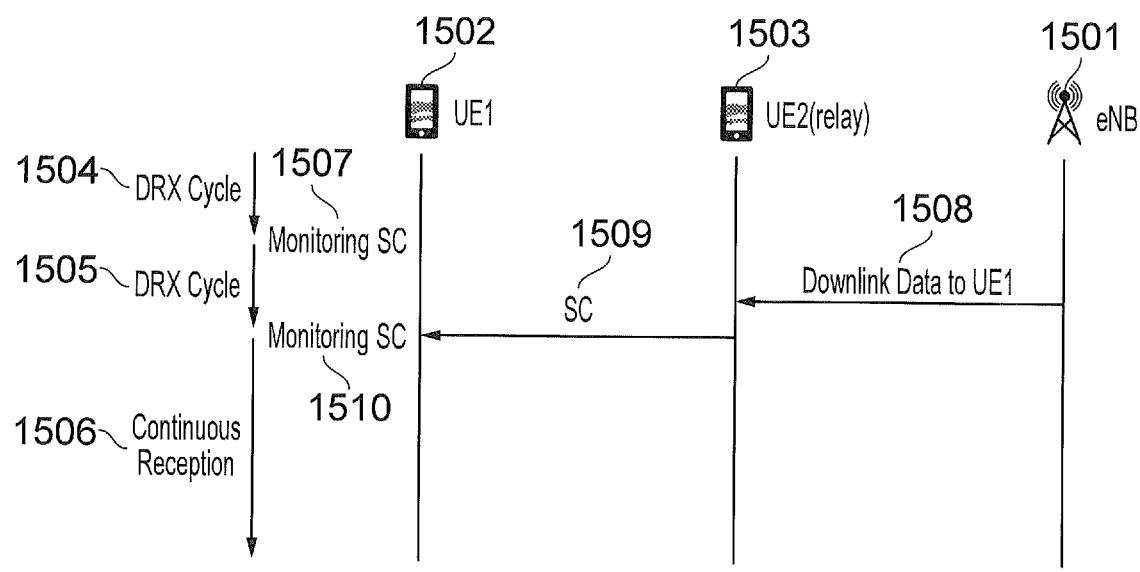
FIG. 15 illustrates an example of data transmission without a paging procedure in accordance with the present technique.

FIG. 15 illustrates an example of data transmission without a paging procedure in a mobile communications network in accordance with the present technique. The mobile communications network of FIG. 15 comprises an eNodeB 1501, a UE 1502 and a UE 1503 which is acting as a UE-NW relay between the eNodeB 1501 and the UE 1502. The UE 1501 may be operating in a DRX-connected mode, and is monitoring SC 1507 and 1510 by a cycle of DRX operation 1504 and 1505. So, the UE 1503 has to send SC including scheduling information regarding the cycle of the operation with DRX. If the UE 1502 finds SC for the UE 1502, the UE 1502 can automatically perform the transition from the DRX-connected mode 1504 and 1505 to the connected mode 1506. Alternatively, the SC may include a notification of leaving the DRX-connected mode 1504 and 1505, and the UE 1502 then performs the transition from the DRX-connected mode 1504 and 1505 to the connected mode 1506. Here, the eNodeB 1505 can transmit downlink data 1508 to the UE 1502 regardless of the cycle of the UE's 1502 operation with DRX, if the relay UE 1503 operates in the connected mode. The UE 1503 receives downlink data 1508 determined for the UE 1502 from the eNodeB 1501 according to scheduling information of PDCCH, and the UE 1503 performs scheduling of the received data to the UE 1502 in a D2D communication manner synchronised to the cycle of the UE's 1502 operation with DRX.

Another activity in the idle mode should be TA updating for mobility management. As mentioned above, the purpose of TA updating is that the network recognises where a UE in the idle mode should be; at least at the extent of an area belonging to the TA. If the remote UE is in the connected mode, the network can recognise that this UE is in the coverage of the current relay UE, so this remote UE doesn't always need to perform a procedure like a sort of TA updating. If the remote UE is in the idle mode, the network can perform the paging to the latest connected relay UE via SC.

The remote UE in the DRX-connected mode can monitor whether SC is transmitted to this remote UE or not, by the cycle of the operation with DRX for the paging purpose from the eNodeB. In the case that the remote UE in the DRX-connected mode under UE-NW relay detects that is entering the coverage area of an eNodeB, based on the measurement of reference signals from the eNodeB, the remote UE promptly releases DRX operation and requests to disconnect from the relay UE and make a transition to the idle mode.

During the procedure of disconnection from the relay UE, TA updating can be performed by the network or the UE before making the transition to the idle mode. If the remote UE detects that it is about to move out of the coverage area of the relay UE as well as that of the eNodeB, regardless of being in the connected mode or the idle mode, the remote UE promptly releases DRX operation and the procedure of relay selection will be triggered in combination with the eNodeB and candidates UEs to act as a relay node. This relay selection can be triggered by the UE or the eNodeB by means of any procedures according to techniques disclosed in our co-pending European patent applications EP15154659.5 and EP15154751.0.

Figure 16:
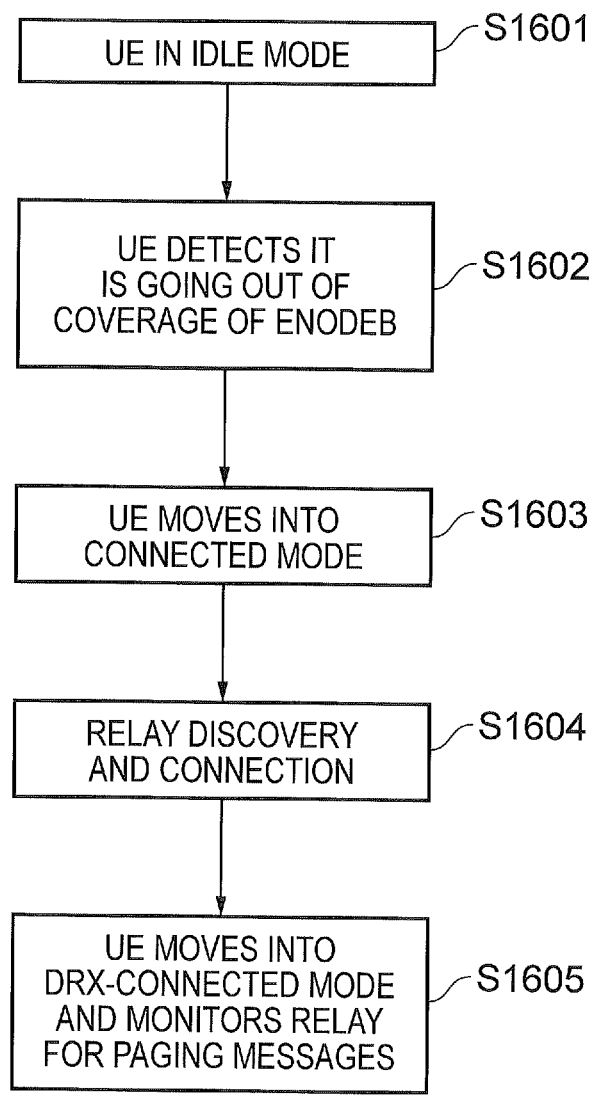
FIG. 16 illustrates an example of a flow diagram illustrating a procedure for the setup of a UE-to-network relay for a UE in an idle mode in accordance with the present technique.

FIG. 16 illustrates an example of a flow diagram illustrating a procedure for the setup of a UE-to-network relay for a UE in an idle mode in accordance with the present technique. In step S1601, a UE is currently operating in an idle mode, where it is not visible to its serving eNodeB. In step S1602, the UE may detect that it is going out of coverage of the eNodeB. Alternatively, the UE may decide that at some point in the future, it may go out of coverage of the eNodeB. In step S1603, the UE moves into a connected mode, and in step S1604, the UE performs a selection and discovery procedure as discussed in reference to previous examples. Once a relay connection has been established, in step S1605, the UE may later move into a DRX-connected mode, in which it monitors only the relay node it is connected to for paging messages.

The techniques disclosed in the present invention are advantageous in that a UE in idle mode will still have a connection to its serving eNodeB, and thus will be able to receive paging messages from the eNodeB via the relay UE. Since the UE is able to remain in idle mode, power may be saved, and power may also be saved by candidate relay UEs and the eNodeB as it is no longer necessary to transmit discovery messages without knowledge of the location of the UE. Further, the UE may operate in a DRX-connected mode, in which it operates with extended discontinuous reception (DRX). The UE may be in a connected mode briefly before returning to an idle mode as part of a DRX cycle. By relay UEs sending Sidelink Control (SC) information including scheduling information to the UE in the DRX-connected mode by the DRX cycle synchronised to the UE's operation with DRX, a similar procedure to the paging procedure for the standard idle mode may be carried out, again saving the UEs and eNodeB power.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

Various further aspects and features are defined in the following numbered paragraphs:

Paragraph 1. A communications terminal forming part of a mobile communications network comprising one or more infrastructure equipment and one or more other communications terminals, the communications terminal comprising a transmitter configured to transmit signals via a wireless access interface to the infrastructure equipment and to transmit signals via the wireless access interface to one or more of the other communications terminals in accordance with a device-to-device communications protocol, and a receiver configured to receive signals via the wireless access interface from the infrastructure equipment and to receive signals via the wireless access interface from one or more of the other communications terminals in accordance with a device-to-device communications protocol, and a controller configured to control the transmitter and the receiver to transmit and to receive data via the wireless access interface when in a connected mode and to select one of the one or more infrastructure equipment from which to receive paging messages for down-link communications when in an idle mode, wherein the controller is configured to measure, when in the idle mode, signals received by the receiver from any of the one or more infrastructure equipment, and in accordance with predetermined conditions, to enter a connected mode, to discover that one or more of the other communications terminals can act as a relay node to transmit signals to one of the one or more infrastructure equipment which represent data having been transmitted by the transmitter and received by the relay node and to receive signals from the relay node which represent data transmitted by the infrastructure equipment for the communications terminal, to select one of the discovered communications terminals to act as a relay node for the communications terminal, and to establish a connection with the infrastructure equipment via the relay node to register with the mobile communications network that paging messages for the communications terminal should be transmitted to the relay node, for transmission to the communications terminal.

Paragraph 2. A communications terminal according to paragraph 1, wherein the receiver is configured in combination with the controller to operate in accordance with an extended discontinuous reception (DRX) communications protocol, wherein the receiver being configured in combination with the controller to operate in accordance with the DRX communications protocol comprises the controller being configured to enter a DRX-connected mode in which the controller controls the receiver to only monitor the communications terminal acting as a relay node to determine whether the receiver can no longer receive the paging messages from the communications terminal acting as a relay node, wherein when in the DRX-connected mode, the controller is configured to control the receiver to be configured receive signals for a predetermined portion of a predetermined period, wherein the predetermined period is determined in accordance with a DRX cycle.

Paragraph 3. A communications terminal according to paragraph 1 or 2, wherein the predetermined period of the DRX cycle is configured to be set by the controller in combination with one of the one or more infrastructure equipment.

Paragraph 4. A communications terminal according to paragraph 1, 2 or 3, wherein the predetermined period of the DRX cycle is configured to be changed by one of the one or more infrastructure equipment, and the changed predetermined period of the DRX cycle is received by the receiver from the infrastructure equipment via the communications terminal acting as a relay node.

Paragraph 5. A communications terminal according to paragraphs 1 to 4, wherein the communications terminal being configured to enter the DRX-connected mode is automatic.

Paragraph 6. A communications terminal according to paragraphs 1 to 5, wherein the communications terminal being configured to enter the DRX-connected mode comprises the controller being configured to detect that the connection to the communications terminal acting as a relay node has been established, to set a timer, to detect that the transmitter has not transmitted signals to the communications terminal acting as a relay node and the receiver has not received signals from the communications terminal acting as a relay node after the predetermined time at the timer is set to expire, and consequently, to enter the DRX-connected mode.

Paragraph 7. A communications terminal according to paragraphs 1 to 6, wherein the timer is configured to expire after a predetermined time.

Paragraph 8. A communications terminal according to paragraphs 1 to 7, wherein the timer is configured to expire after a time configured by the infrastructure equipment.

Paragraph 9. A communications terminal according to paragraphs 1 to 8, wherein the controller is configured to detect that the receiver can no longer receive the paging messages from the communications terminal acting as a relay node, and consequently to search for a second communications terminal to act as a relay node or to search for an infrastructure equipment with which the transmitter and receiver can transmit and receive signals.

Paragraph 10. A communications terminal according to paragraphs 1 to 9, wherein the predetermined conditions comprise a relative quality of the signals being below a predetermined threshold.

Paragraph 11. A communications terminal according to paragraphs 1 to 10, wherein the predetermined conditions comprise a relative quality of the signals being below a dynamic threshold, wherein the dynamic threshold is dynamically configured by the infrastructure equipment.

Paragraph 12. A communications terminal according to paragraphs 1 to 11, wherein the discovering that one or more of the other communications terminals can act as a relay node comprises the communications terminal transmitting a discovery signal, and consequently the communications terminal receiving an acknowledgement signal from the one or more of the other communications terminals.

Paragraph 13. A communications terminal according to paragraphs 1 to 12, wherein the discovering that one or more of the other communications terminals can act as a relay node comprises the communications terminal receiving a discovery signal transmitted by the one or more of the other communications terminals, and consequently the communications terminal transmitting an acknowledgement signal to the one or more of the other communications terminals.

Paragraph 14. A communications terminal according to paragraphs 1 to 13, wherein the communications terminal is configured to detect that the receiver can receive paging messages from any of the one or more infrastructure equipment, to discover that one or more of the other communications terminals can act as a relay node, to select one of the discovered communications terminals to act as a relay node for the communications terminal, and to establish a connection with the infrastructure equipment via the relay node to register with the mobile communications network that paging messages for the communications terminal should be transmitted to the relay node, for transmission to the communications terminal.

Paragraph 15. A communications terminal according to paragraphs 1 to 14, wherein the selecting of one of the discovered communications terminals to act as a relay node for the communications terminal is controller by the infrastructure equipment.

REFERENCES

[1] 3GPP TR36.872 V12.1.0, "Small cell enhancements for E-UTRA and E-UTRAN—Physical Layer aspects", December 2013.

[2] Holma H. and Toskala A., "LTE for UMTS OFDMA and SC-FDMA Based Radio Access", John Wiley & Sons Limited, January 2010.

[3] LTE for UMTS: OFDMA and SC-FDMA Based Radio Access, Harris Holma and Antti Toskala, Wiley 2009, ISBN 978-0-470-99401-6.

The invention claimed is:

1. A communications terminal forming part of a mobile communications network comprising one or more infrastructure equipment and one or more other communications terminals, the communications terminal comprising a transmitter configured to transmit signals via a wireless access interface to the infrastructure equipment and to transmit signals via the wireless access interface to one or more of the other communications terminals in accordance with a device-to-device communications protocol, a receiver configured to receive signals via the wireless access interface from the infrastructure equipment and to receive signals via the wireless access interface from one or more of the other communications terminals in accordance with a device-to-device communications protocol, and circuitry comprising a controller configured to control the transmitter and the receiver to transmit and to receive data via the wireless access interface when in a connected mode and to select one of the one or more infrastructure equipment from which to receive paging messages for down-link communications when in an idle mode, wherein the controller is configured to measure, when in the idle mode, signals received by the receiver from any of the one or more infrastructure equipment, and in accordance with predetermined conditions, to enter the connected mode, to discover that one or more of the other communications terminals can act as a relay node to transmit signals to one of the one or more infrastructure equipment which represent data having been transmitted by the transmitter and received by the relay node and to receive signals from the relay node which represent data transmitted by the infrastructure equipment for the communications terminal, to select one of the discovered communications terminals to act as the relay node for the communications terminal, to establish a connection in the connected mode with the infrastructure equipment via the relay node to register with the mobile communications network that paging messages for the communications terminal should be transmitted to the relay node, for transmission to the communications terminal, and to switch from the connected mode to a DRX-connected mode that uses an extended discontinuous reception (DRX) communications protocol and that is distinct from the connected mode and operate in accordance with the DRX communications protocol, wherein, in the DRX-connected mode, the controller controls the receiver to monitor only the one of the one or more communications terminals acting as the relay node.

2. The communications terminal as claimed in claim 1, wherein the receiver being configured in combination with the controller to operate in accordance with the DRX communications protocol comprises the controller being configured to enter the DRX-connected mode in which the controller controls the receiver to only monitor the communications terminal acting as the relay node to determine whether the receiver can no longer receive the paging messages from the communications terminal acting as the relay node, wherein when in the DRX-connected mode, the controller is configured to control the receiver to be configured receive signals for a predetermined portion of a predetermined period, wherein the predetermined period is determined in accordance with a DRX cycle.

3. The communications terminal as claimed in claim 2, wherein the predetermined period of the DRX cycle is configured to be set by the controller in combination with one of the one or more infrastructure equipment.

4. The communications terminal as claimed in claim 2, wherein the predetermined period of the DRX cycle is configured to be changed by one of the one or more infrastructure equipment, and the changed predetermined period of the DRX cycle is received by the receiver from the infrastructure equipment via the communications terminal acting as a relay node.

5. The communications terminal as claimed in claim 2, wherein the communications terminal being configured to enter the DRX-connected mode is automatic.

6. The communications terminal as claimed in claim 2, wherein the communications terminal being configured to enter the DRX-connected mode comprises the controller being configured to detect that the connection to the communications terminal acting as a relay node has been established, to set a timer, to detect that the transmitter has not transmitted signals to the communications terminal acting as a relay node and the receiver has not received signals from the communications terminal acting as a relay node after the predetermined time at the timer is set to expire, and consequently, to enter the DRX-connected mode.

7. The communications terminal as claimed in claim 6, wherein the timer is configured to expire after a predetermined time.

8. The communications terminal as claimed in claim 6, wherein the timer is configured to expire after a time configured by the infrastructure equipment.

9. The communications terminal as claimed in claim 2, wherein the controller is configured to detect that the receiver can no longer receive the paging messages from the communications terminal acting as a relay node, and consequently to search for a second communications terminal to act as a relay node or to search for an infrastructure equipment with which the transmitter and receiver can transmit and receive signals.

10. The communications terminal as claimed in claim 1, wherein the predetermined conditions comprise a relative quality of the signals being below a predetermined threshold.

11. The communications terminal as claimed in claim 1, wherein the predetermined conditions comprise a relative quality of the signals being below a dynamic threshold, wherein the dynamic threshold is dynamically configured by the infrastructure equipment.

12. The communications terminal as claimed in claim 1, wherein the discovering that one or more of the other communications terminals can act as a relay node comprises the communications terminal transmitting a discovery signal, and consequently the communications terminal receiving an acknowledgement signal from the one or more of the other communications terminals.

13. The communications terminal as claimed in claim 1, wherein the discovering that one or more of the other communications terminals can act as a relay node comprises the communications terminal receiving a discovery signal transmitted by the one or more of the other communications terminals, and consequently the communications terminal transmitting an acknowledgement signal to the one or more of the other communications terminals.

14. The communications terminal as claimed in claim 1, wherein the communications terminal is configured to detect that the receiver can receive paging messages from any of the one or more infrastructure equipment, to discover that one or more of the other communications terminals can act as a relay node, to select one of the discovered communications terminals to act as a relay node for the communications terminal, and to establish a connection with the infrastructure equipment via the relay node to register with the mobile communications network that paging messages for the communications terminal should be transmitted to the relay node, for transmission to the communications terminal.

15. The communications terminal as claimed in claim 1, wherein the selecting of one of the discovered communications terminals to act as a relay node for the communications terminal is controller by the infrastructure equipment.

16. A method of operating a communications terminal forming part of a mobile communications network comprising one or more infrastructure equipment and one or more other communications terminals, the method comprising transmitting and receiving data via a wireless access interface when in a connected mode, selecting one of the one or more other communications terminals to act as a relay node for the communications terminal, establishing a connection in the connected mode with the infrastructure equipment via the relay node to register with the mobile communications network that paging messages for the communications terminal should be transmitted to the relay node, for transmission to the communications terminal, and upon establishing the connection with the infrastructure equipment via the relay node, switching from the connected mode to a DRX-connected mode that uses an extended discontinuous reception (DRX) communications protocol and that is distinct from the connected mode and operating in accordance with the DRX communications protocol, and in the DRX-connected mode, monitoring only the one of the one or more communications terminals acting as the relay node.

17. Circuitry for a communications terminal forming part of a mobile communications network comprising one or more infrastructure equipment and one or more other communications terminals, the communications terminal comprising a transmitter configured to transmit signals via a wireless access interface to the infrastructure equipment and to transmit signals via the wireless access interface to one or more of the other communications terminals in accordance with a device-to-device communications protocol, and a receiver configured to receive signals via the wireless access interface from the infrastructure equipment and to receive signals via the wireless access interface from one or more of the other communications terminals in accordance with a device-to-device communications protocol, and a controller configured to control the transmitter and the receiver to transmit and to receive data via the wireless access interface when in a connected mode, wherein the controller is configured to select one of the one or more other communications terminals to act as a relay node for the communications terminal, to establish a connection in the connected mode with the infrastructure equipment via the relay node to register with the mobile communications network that paging messages for the communications terminal should be transmitted to the relay node, for transmission to the communications terminal, and upon establishing the connection with the infrastructure equipment via the relay node, and to switch from the connected mode to a DRX-connected mode that uses an extended discontinuous reception (DRX) communications protocol and that is distinct from the connected mode and operate in accordance with the DRX communications protocol, wherein, in the DRX-connected mode, the controller controls the receiver to monitor only the one of the one or more communications terminals acting as the relay node.

* * * * *